(12) United States Patent  
Fukuda et al.

(10) Patent No.: US 7,458,518 B2  
(45) Date of Patent: Dec. 2, 2008

(54) LOOP ANTENNA AND ELECTRONIC EQUIPMENT INCLUDING LOOP ANTENNA

(75) Inventors: Toshinari Fukuda, Kato-gun (JP); Manabu Ogino, Kato-gun (JP); Susumu Nikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/369,844

(22) Filed: Mar. 8, 2006

(65) Prior Publication Data

US 2007/0158438 A1   Jul. 12, 2007

(30) Foreign Application Priority Data

Dec. 15, 2005   (JP) .............................. 2005-361681

(51) Int. Cl.
  *G06K 19/06*   (2006.01)
(52) U.S. Cl. .................. 235/492; 235/487; 235/488
(58) Field of Classification Search .......... 235/492, 235/375, 487, 488; 343/702, 741, 743, 744, 343/751, 748, 895, 742, 867, 866, 855; 340/572.5, 340/572.1; 455/41.1
See application file for complete search history.

(56) References Cited

U.S. PATENT DOCUMENTS 5,422,650 A * 6/1995 Hill .............................. 343/713

2005/0264460 A1 * 12/2005 Sunaga ........................ 343/702

FOREIGN PATENT DOCUMENTS

JP    2000-269725      9/2000
JP    2003-085519  *   3/2003

OTHER PUBLICATIONS

Youbok Lee—"Antenna Circuit Design for RFID Applications" published by Microchip Technologies Inc. on 2003.*

* cited by examiner

*Primary Examiner*—Ahshik Kim
(74) *Attorney, Agent, or Firm*—Westerman, Hattori, Daniels & Adrian, LLP.

(57)   ABSTRACT

The present invention is intended to improve the receiving performance of a loop antenna to be connected to an IC chip that is incorporated in an IC card or a portable cellular phone. A loop antenna that is connected to an IC chip which has a CPU and a memory mounted thereon and which is incorporated in a casing, and that transmits or receives predetermined electromagnetic waves to or from a reader writer includes a main loop antenna and at least one sub-loop antenna disposed away from the main loop antenna. The sub-loop antenna is connected to the IC chip in parallel with or in series with the main loop antenna. A transmission/reception frequency at which the sub-loop antenna transmits or receives electromagnetic waves may be different from the one at which the main loop antenna transmits or receives electromagnetic waves.

11 Claims, 6 Drawing Sheets

LOOP ANTENNA AND ELECTRONIC EQUIPMENT INCLUDING LOOP ANTENNA

CROSS-REFERENCE TO RELATED APPLICATION

This application claims priority from, and incorporates by reference the entire disclosure of, Japanese Patent application No. 2005-361681 filed on Dec. 15, 2005.

BACKGROUND OF THE INVENTION

1. Field of the Invention

The present invention relates to a loop antenna and electronic equipment including the loop antenna. More particularly, the present invention is concerned with a loop antenna to be adapted to a device in or from which data is written or read in a non-contact manner, such as an IC card, and electronic equipment including the loop antenna, such as a portable cellular phone.

2. Description of the Related Art

In recent years, IC cards, having a built-in IC in which information such as data of receipts and payments of money can be stored, have prevailed. Information on a commuter pass, a role of an IC card, and information on stations at which a user of the IC card gets on or off are stored in the IC card. The user of the IC card may use the IC card as a computer pass or a ticket to pass through an automatic ticket gate in a railway station in a non-contact manner. Otherwise, the user of the IC card stores a credited (charged) sum in the IC card, and uses the IC card as digital cash to pay small sums of money at shops or convenience stores. Moreover, depending on information stored in the IC card, the IC card may be used as a staff ID card or a student ID card.

Generally, a cell that supplies power is not incorporated in the non-contact type IC card, but an IC chip on which a CPU and a memory are mounted, and a resonant circuit composed of a loop antenna and a resonant capacitor are incorporated therein. Weak electromagnetic waves sent from an external reader writer are caught by the loop antenna incorporated in the IC card, whereby power is generated and used to operate the IC chip. When reply data produced by the IC chip is radiated from the loop antenna, the reader writer recognizes the IC card. Mutual authentication is duly performed. If the result of authentication signifies that the IC card is authentic, data is read or written in or from the reader writer or the IC card. A series of reading/writing actions is performed instantaneously.

The IC chip and loop antenna have come to be incorporated not only in the IC card but also in electronic equipment, for example, a portable cellular phone. This reflects the trend of the reader writer being installed at kiosks or included in vending machines. When the IC chip and loop antenna are incorporated in the portable cellular phone, the portable cellular phone can be used as digital cash. This promotes the use of digital cash.

FIG. 6 included in Japanese Unexamined Patent Application Publication No. 2000-269725 shows the internal circuitry of an IC card. The IC card internally includes a loop antenna having taps to an IC chip at both ends of the loop antenna. Moreover, the loop antenna is divided into three portions due to the intermediate taps. A first capacitor is connected to the first portion of the loop antenna, whereby a first resonant circuit is formed. The second portion of the loop antenna has no connection. A second capacitor is connected to the third portion of the loop antenna, whereby a second resonant circuit is formed. The resonant frequencies of the first and second resonant circuits can be differentiated from each other by varying the capacitances of the included capacitors.

The thus configured IC card can be applied to various usages in addition to the aforesaid one. Therefore, a loop antenna is expected to have the communicative performance thereof improved, and to cope with the adverse effect of metal in the case where the loop antenna is incorporated in electronic equipment. Specifically, when the aforesaid loop antenna and IC chip are incorporated in portable electronic equipment such as a portable cellular phone, the loop antenna is susceptible to metal and, for example, the metallic part of a cell incorporated in the equipment. In this case, the cell alone has been shielded with a magnetic substance in the past.

Furthermore, a communication range within which the IC card can communicate with a reader writer varies depending on the reader writer employed. Moreover, the reader writer may be available in various types but not in all types. The IC card is therefore required to exhibit a stable performance in whichever of diverse usages the IC card is applied. Moreover, the loop antenna and IC chip are required to exhibit stable performance even if they are incorporated in electronic equipment, such as a portable cellular phone, other than an IC card.

As mentioned above, the IC card or electronic equipment in which the loop antenna and IC chip are incorporated is useful and promising but has the drawbacks described below.

(1) When only one loop antenna is incorporated together with an IC chip in a communication system, the detectable range offered by the communication system is limited.

(2) As a communication method utilizes electromagnetic coupling, when a loop antenna and an IC chip are incorporated in electronic equipment, the loop antenna is susceptible to metal included in the casing.

(3) As a resonant antenna unit is disposed in a narrow space in electronic equipment, a communication range is limited to an area defined by the space. Once the antenna unit is affected by any metal or radiation noise, even if the resonant frequencies of first and second resonant circuits are differentiated from each other, communication cannot be maintained satisfactorily.

SUMMARY OF THE INVENTION

Accordingly, an object of the present invention is to provide a loop antenna that overcomes the aforesaid drawbacks (1) to (3) and electronic equipment including the loop antenna.

A loop antenna in accordance with the present invention that accomplishes the above object has the four aspects described below. According to the first aspect, a loop antenna is connected to an IC chip that has a CPU and a memory mounted thereon and that is incorporated in a casing, and transfers predetermined electromagnetic waves to or from a reader writer. The loop antenna includes a main loop antenna and at least one sub-loop antenna disposed away from the main loop antenna.

According to the second aspect, the loop antenna in accordance with the first aspect has the sub-loop antenna and main loop antenna connected in parallel with each other to the IC chip. According to the third aspect, the loop antenna in accordance with the first aspect has the sub-loop antenna and main loop antenna connected in series with each other to the IC chip.

The fourth aspect is identical to any of the first to third aspects except that a transmission/reception frequency at which the sub-loop antenna transmits or receives electromagnetic waves is differentiated from a transmission/reception frequency at which the main loop antenna transmits or receives electromagnetic waves.

Furthermore, electronic equipment including the loop antenna in accordance with the present invention has the loop antenna in accordance with the first aspect incorporated therein.

As mentioned above, the present invention can expand a communication range within which an IC card system including an IC chip and a loop antenna or electronic equipment having the IC chip and loop antenna incorporated in a casing thereof can communicate with a reader writer. Moreover, the IC card system or electronic equipment are not susceptible to metal, and can communicate with the reader writer satisfactorily.

BRIEF DESCRIPTION OF THE DRAWINGS

The present invention is illustrated by way of example and not limitation in the figure of the accompanying drawings in which like references indicate similar elements. Note that the following figures are not necessarily drawn to scale.

DESCRIPTION OF THE PREFERRED EMBODIMENTS

Before describing the preferred embodiments, an explanation will be given of the conventional IC card shown in FIG. 1.

Figure 1:
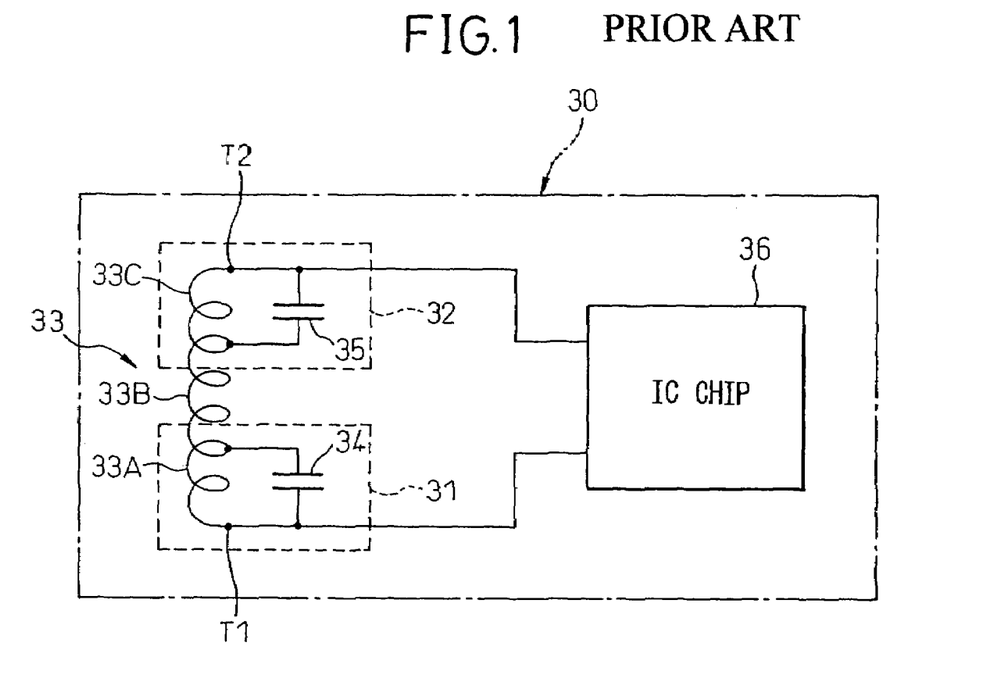
FIG. 1 is a circuit diagram showing the configuration of an IC card having a conventional loop antenna incorporated therein.

FIG. 1 shows the internal circuitry of a conventional IC card 30 shown in FIG. 6 included in Japanese Unexamined Patent Application Publication No. 2000-269725. A loop antenna 33 is incorporated in the IC card 30 and has the taps T1 and T2 to an IC chip 36 made at both ends thereof. Moreover, the loop antenna 33 is divided into three portions 33A, 33B, and 33C due to intermediate taps T3 and T4. A first capacitor 34 is connected to the first portion 33A of the loop antenna 33, whereby a first resonant circuit 31 is formed. The second portion 33B has no connection. A second capacitor 35 is connected to the third portion 33C, whereby a second resonant circuit 32 is formed. The resonant frequencies of the first and second resonant circuits 31 and 32 respectively may be differentiated from each other by varying the capacitances of the capacitors 34 and 35.

The thus configured IC card 30 is presumably applied to various usages in addition to the aforesaid usage. The loop antenna is therefore requested to improve communicative performance or to cope with the adverse effect of metal exerted in a case where the loop antenna 33 is incorporated in electronic equipment. Specifically, when the loop antenna 33 and IC chip 36 are incorporated in portable electronic equipment such as a portable cellular phone, the loop antenna 33 is susceptible to metal and, for example, to a metallic part of a cell incorporated in the equipment. In this case, the cell alone has been shielded with a magnetic substance in the past.

Furthermore, a communication range within which the IC card 30 can communicate with a reader writer varies depending on the reader writer employed. Moreover, the reader writer may be available in a plurality of types. The IC card 30 is requested to exhibit stable performance to whichever of various usages the IC card is applied. Even when the loop antenna and IC chip are incorporated in electronic equipment, such as a portable cellular phone, other than the IC card, the electronic equipment is required to exhibit stable performance.

Figure 2:
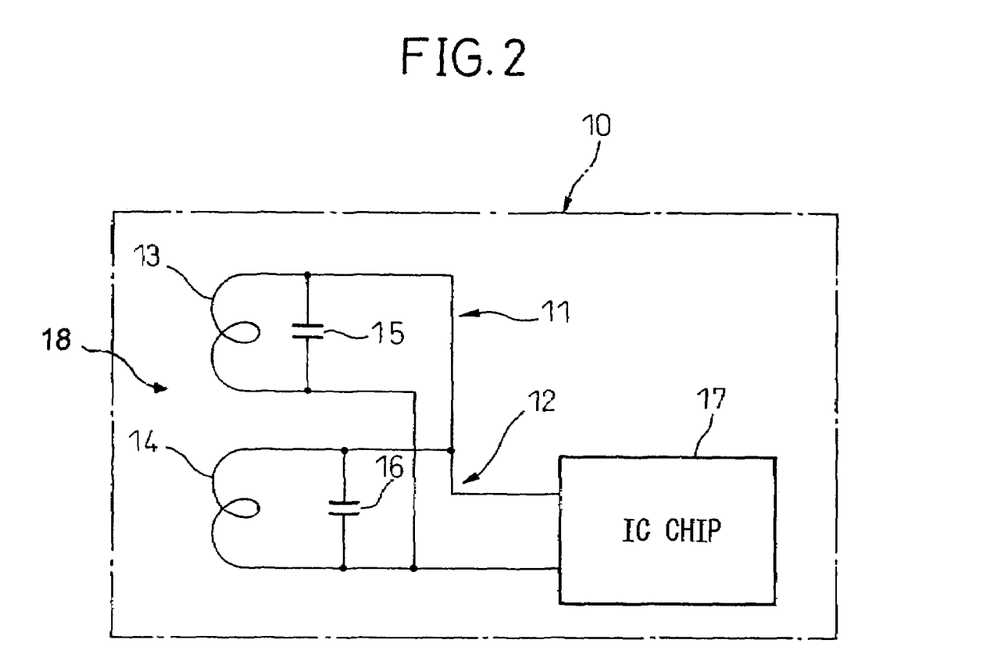
FIG. 2 is a circuit diagram showing the configuration of an IC card having a loop antenna in accordance with the first embodiment of the present invention incorporated therein.

FIG. 2 shows the configuration of an IC card 10 having a loop antenna 18 in accordance with the first embodiment of the present invention incorporated therein. In the first embodiment, a first resonant circuit 11 composed of a first loop antenna (first resonant coil) 13 and a first capacitor 15 and a second resonant circuit 12 composed of a second loop antenna (second resonant coil) 14 and a second capacitor 16 are connected in parallel with each other to an IC chip 17 incorporated in the IC card 10. The IC chip 17 is realized with a known chip having a CPU and a memory mounted thereon. An iterative description of the IC chip will be omitted.

The resonant frequencies of the first and second resonant circuits 11 and 12 respectively may be identical to each other or different from each other. Assuming that a communication frequency at which a reader writer, that is not shown, communicates with the IC card 10 may be varied, if the resonant frequency of the second resonant circuit 12 is differentiated from that of the first resonant circuit by a value falling within the magnitude of the variation, the IC card 10 can satisfactorily communicate with the reader writer. Moreover, the first and second loop antennas 13 and 14 included in the IC card 10 may not be superposed on each other but may be disposed away from each other. The first and second loop antennas 13 and 14 may not be the same size.

Figure 3:
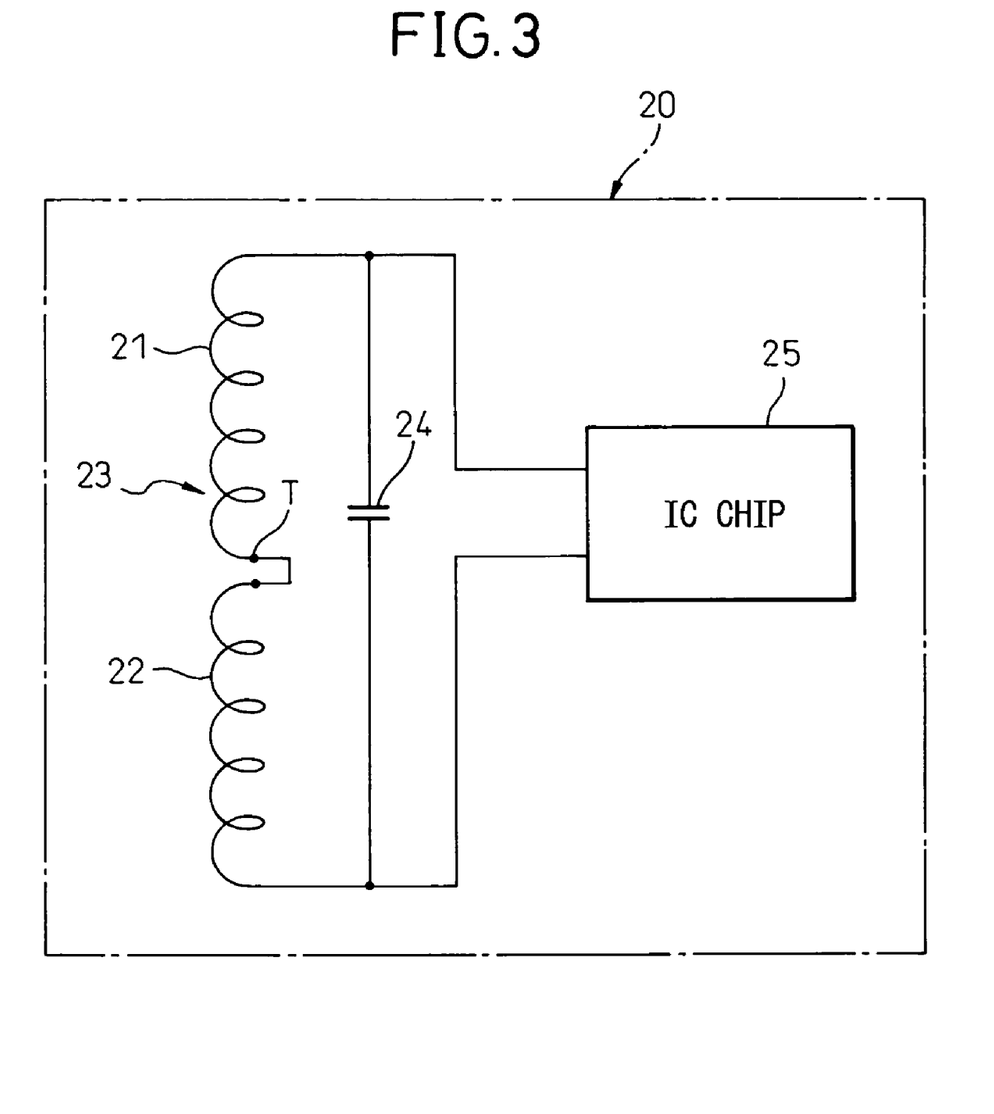
FIG. 3 is a circuit diagram showing the configuration of an IC card having a loop antenna in accordance with the second embodiment of the present invention incorporated therein.

FIG. 3 shows the configuration of an IC card 20 having a loop antenna in accordance with the second embodiment of the present invention incorporated therein. In the second embodiment, a loop antenna 23 that is a resonant coil and a resonant capacitor 24 are connected in parallel with each other to an IC chip 25 incorporated in the IC card. The loop antenna 23 is divided into a first loop antenna 21 and a second loop antenna 23 due to an intermediate tap T. The first loop antenna 21 and second loop antenna 22 into which the loop antenna 23 is divided are not superposed on each other but disposed away from each other. The IC chip 25 is identical to the IC chip 17 employed in the first embodiment.

A position at which the internal tap T is made may not be an intermediate point in the loop antenna 23. In this case, the resonant frequencies of resonant circuits formed using the first and second loop antennas 21 and 22 respectively may be differentiated from each other.

Figure 4:
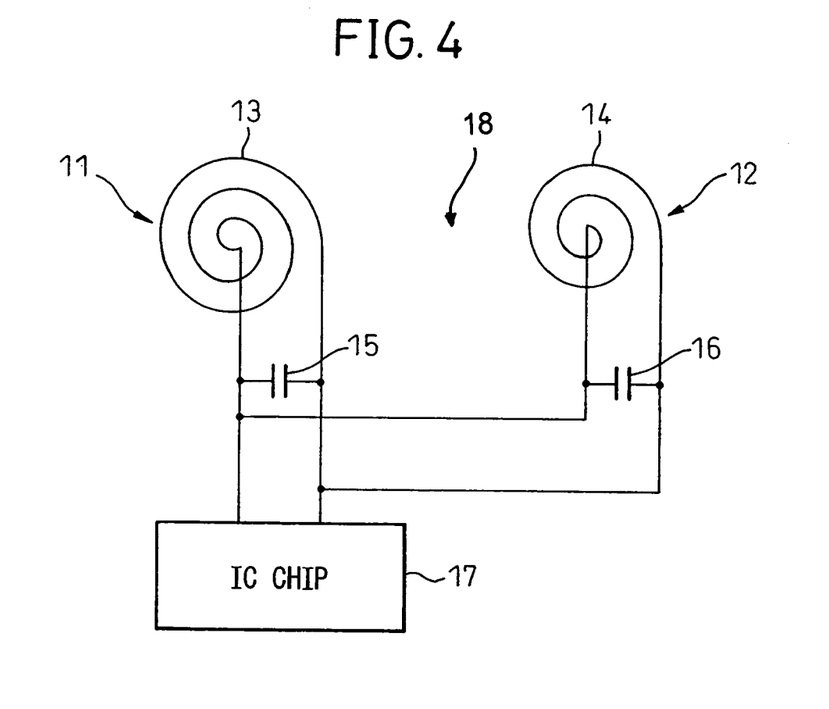
FIG. 4 is a circuit diagram showing a concrete example of the loop antenna in accordance with the first embodiment of the present invention shown in FIG. 2.

FIG. 4 shows a concrete example of the first and second loop antennas 13 and 14 included in the first embodiment of the present invention shown in FIG. 2. The same reference numerals are assigned to members identical to the members described in conjunction with FIG. 2. In the first embodiment, the first loop antenna 13 is larger in size and is adopted as a main loop antenna. The second loop antenna 14 is smaller in size than the first loop antenna 13, and is adopted as a sub-loop antenna. When the first and second loop antennas 13 and 14 are incorporated in electronic equipment, for example, a portable cellular phone to be described later, they are disposed at different positions.

Figure 5:
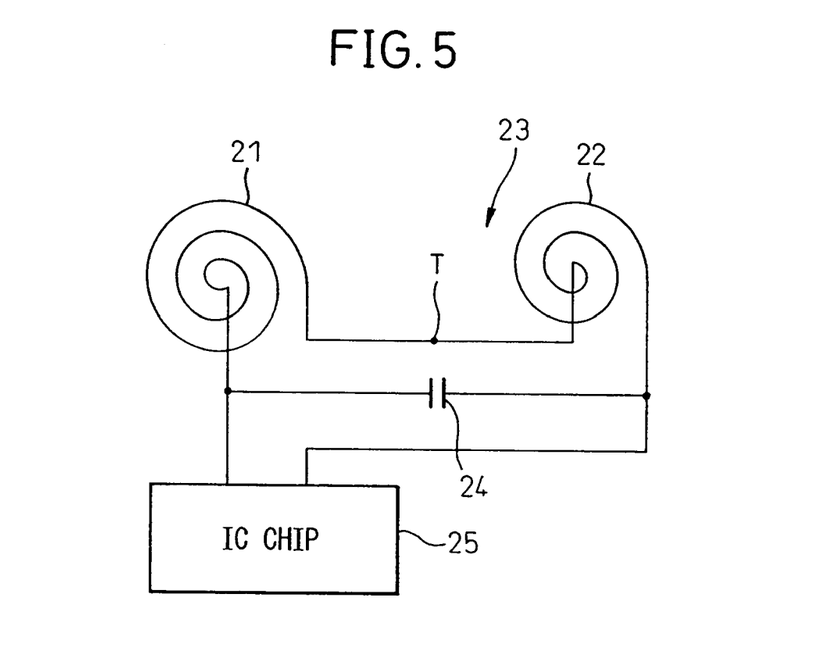
FIG. 5 is a circuit diagram showing a concrete example of the loop antenna in accordance with the second embodiment of the present invention shown in FIG. 3.

FIG. 5 shows a concrete example of the loop antenna 23 in accordance with the second embodiment of the present invention shown in FIG. 3. The same reference numerals are assigned to members identical to the members described in conjunction with FIG. 3. In the second embodiment, the first loop antenna 21 is larger in size and is adopted as a main loop antenna. The second loop antenna 22 is smaller in size than the first loop antenna, and is adopted as a sub-loop antenna. When the first loop antenna 21 and second loop antenna 22 are incorporated in electronic equipment, for example, a portable cellular phone to be described later, they are disposed at different positions.

Figure 6:
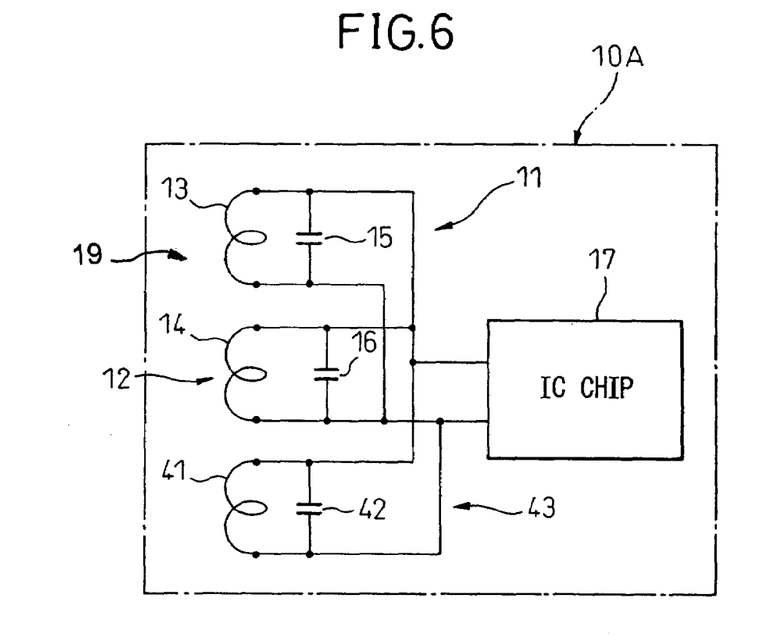
FIG. 6 is a circuit diagram showing the configuration of an IC card having a loop antenna in accordance with the third embodiment of the present invention incorporated therein.

FIG. 6 shows the configuration of an IC card 10A having a loop antenna 19 in accordance with the third embodiment of the present invention incorporated therein. The IC card 10A in accordance with the third embodiment has a third resonant circuit 43, which is composed of a third loop antenna 41 and a third capacitor 42, connected in parallel with a first resonant circuit 11 composed of a first loop antenna 13 and a first capacitor 15 and identical to the one incorporated in the IC card 10 in accordance with the first embodiment, and a second resonant circuit 12 composed of a second loop antenna 14 and a second capacitor 16 and identical to the one incorporated in the IC card 10 in accordance with the first embodiment. The IC chip 17 is identical to the one included in the first embodiment.

The resonant frequencies of the first, second, and third resonant circuits 11, 12, and 43 may be identical to one another but may be different from one another. When the resonant frequencies are different from one another, the resonant frequency of, for example, the second resonant circuit 12 is set to a frequency higher than a communication frequency at which a reader writer communicates with the IC card, by a magnitude by which the communication frequency may be varied upwards. The resonant frequency of the third resonant circuit 43 is set to a frequency lower than the communication frequency of the reader writer by a magnitude by which the communication frequency may be varied downwards. Whichever of upwards and downwards the communication frequency of the reader writer is varied, the IC card 10A can satisfactorily communicate with the reader writer.

Furthermore, the first loop antenna 13, second loop antenna 14, and third loop antenna 41 may not be superposed on one another in the IC card 10A but may be disposed away from one another therein. The first, second, and third loop antennas 13, 14, and 41 may not have the same size. For example, the first loop antenna 13 may be larger in size and adopted as a main loop antenna. The second and third loop antennas 14 and 41 may be smaller than the first loop antenna, and adopted as sub-loop antennas.

Figure 7:
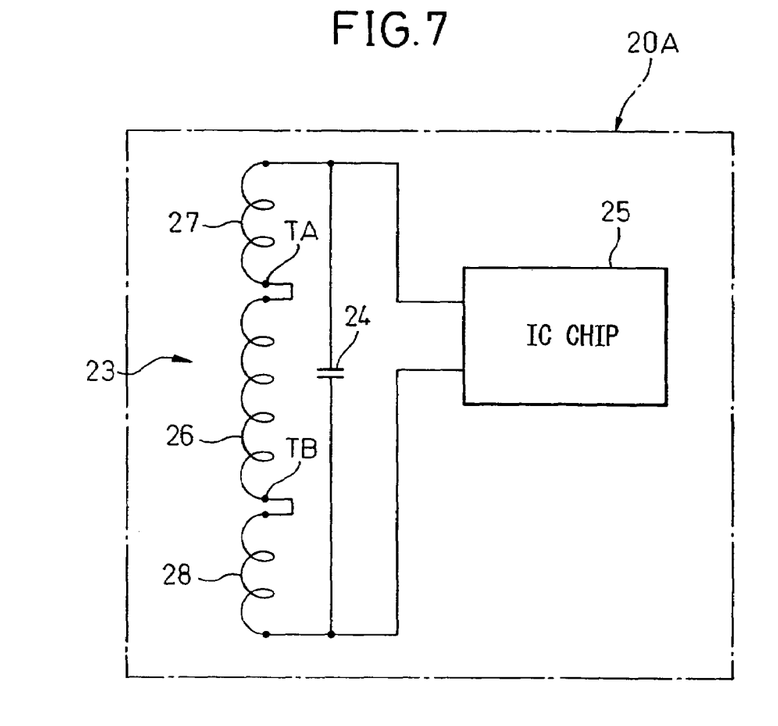
FIG. 7 is a circuit diagram showing the configuration of an IC card having a loop antenna in accordance with the fourth embodiment of the present invention incorporated therein.

FIG. 7 shows the configuration of an IC card 20A having a loop antenna 23 in accordance with the fourth embodiment of the present invention incorporated therein. In the second embodiment described in conjunction with FIG. 3, the loop antenna 23 that is a resonant coil and the resonant capacitor 24 are connected in parallel with each other to the IC chip 25 incorporated in the IC card 20. On the other hand, in the fourth embodiment shown in FIG. 7, the loop antenna 23 incorporated in the IC card 20A is divided into first, second, and third loop antennas 26, 27, and 28 due to intermediate taps TA and TB. The three loop antennas 26, 27, and 28 are not superposed on one another but are disposed away from one another. The IC chip 25 is identical to the IC chip 17 included in the first embodiment.

Positions at which the intermediate taps TA and TB are made are determined so that the first loop antenna 26 will be the largest in size and the second and third loop antennas 27 and 28 will be smaller in size. Similarly to the third embodiment, if resonant frequencies determined by the three loop antennas 26, 27, and 28 and the capacitor 24 are determined in consideration with a magnitude by which a communication frequency at which a reader writer communicates with the IC card is varied, whichever of upwards or downwards the communication frequency of the reader writer is varied, the IC card 20A can satisfactorily communicate with the reader writer.

Figure 8:
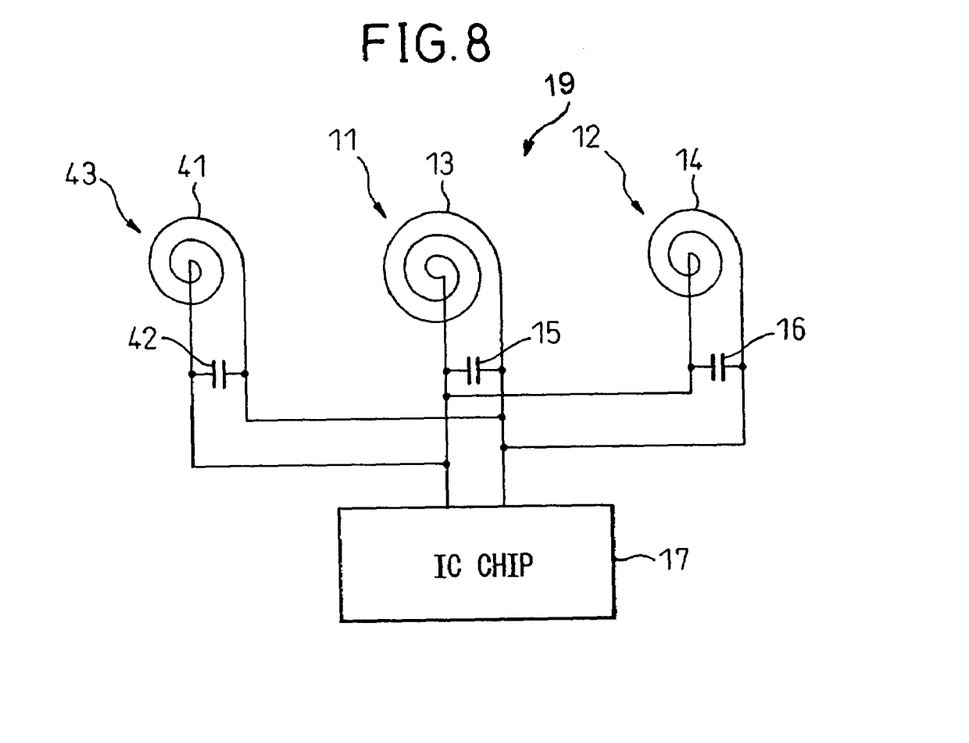
FIG. 8 is a circuit diagram showing a concrete example of the loop antenna in accordance with the third embodiment of the present invention shown in FIG. 6.

FIG. 8 shows a concrete example of the loop antenna 19 having the first, the second, and the third loop antennas 13, 14, and 41 in accordance with the third embodiment of the present invention shown in FIG. 6. The same reference numerals are assigned to members identical to those described in conjunction with FIG. 6. In the third embodiment, the first loop antenna 13 is larger in size and is adopted as a main loop antenna. The second and third loop antennas 14 and 41 are smaller than the first loop antenna 13, and adopted as sub-loop antennas. When the first, second, and third loop antennas 13, 14, and 41 are incorporated in electronic equipment, for example, a portable cellular phone to be described later, they are disposed at different positions.

Figure 9:
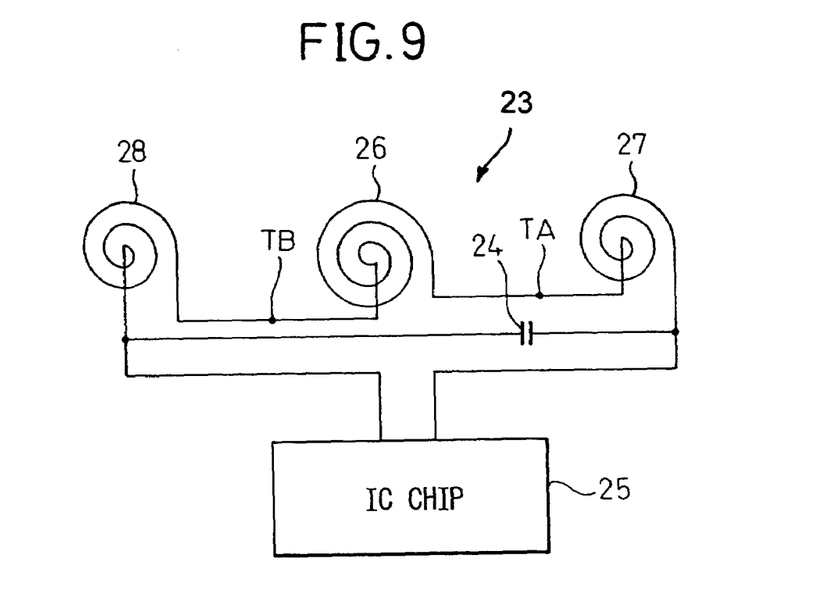
FIG. 9 is a circuit diagram showing a concrete example of the loop antenna in accordance with the fourth embodiment of the present invention shown in FIG. 7.

FIG. 9 shows a concrete example of the loop antenna 23 in accordance with the fourth embodiment of the present invention shown in FIG. 7. The same reference numerals are assigned to members identical to those described in conjunction with FIG. 7. In the fourth embodiment, the first loop antenna 26 is larger in size and is adopted as a main loop antenna. The second and third loop antennas 27 and 28 are smaller than the first loop antenna 21 and are adopted as sub-loop antennas. When the first, second, and third loop antennas 26, 27, and 28 are incorporated in electronic equipment, for example, a portable cellular phone to be described later, the first loop antenna 26 and the second and third loop antennas 27 and 28 are disposed at different positions.

Figure 10A:
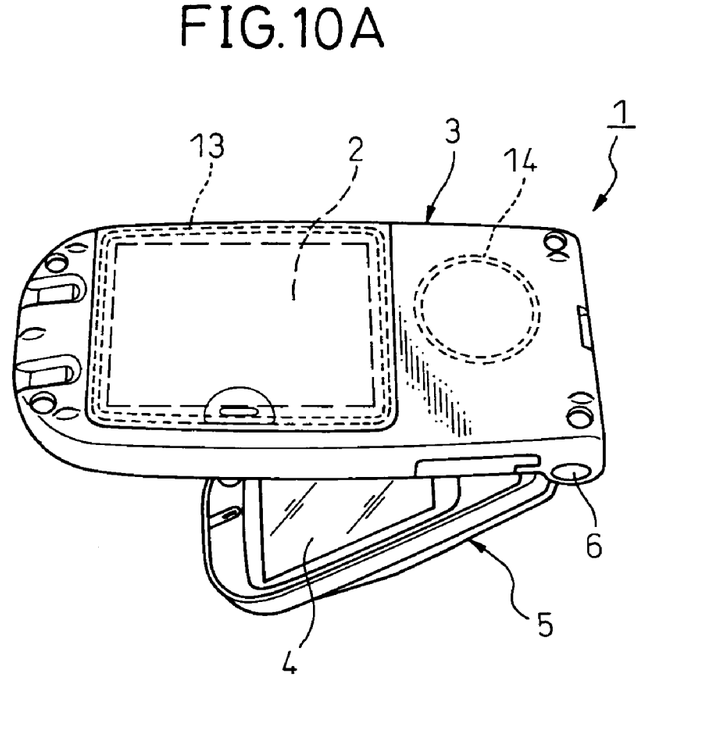
FIG. 10A shows the appearance of a portable cellular phone, that is electronic equipment, to show the first layout to be applied to a case where a main loop antenna and a sub-loop antenna which are included in the present invention are incorporated in the portable cellular phone.

FIG. 10A shows a concrete example of the dispositions of the main loop antenna and sub-loop antenna, which are included in the first or second embodiment of the present invention, in a portable cellular phone 1 that is electronic equipment including a loop antenna. The dispositions of the main loop antenna and sub-loop antenna, which are included in the first embodiment, in the portable cellular phone 1 are identical to those of the main loop antenna and the sub-loop antenna included in the second embodiment. A description will be made using the reference numerals employed in the first embodiment.

The portable cellular phone 1 includes a first casing 3 that accommodates a transmitter having a rechargeable cell 2 and a keyboard incorporated therein, and a second casing 5 that accommodates a receiver including a display 4 and a camera. The two casings 3 and 5 are joined by a hinge 6 and can be engaged with or disengaged from each other. A loop antenna to be connected to an IC chip that is not shown is generally disposed in the first casing 3. In this example, the first loop antenna 13 serving as a main loop antenna is disposed around the rechargeable cell 2, and the second loop antenna 14 serving as a sub-loop antenna is interposed between the rechargeable cell 2 and hinge 6 in the casing.

Consequently, the first loop antenna 13 may be adversely affected by a metal included in the rechargeable cell 2. However, as the second loop antenna 14 is disposed away from the rechargeable cell 2, the second loop antenna 14 is hardly affected by the metal included in the rechargeable cell 2. Consequently, even when the first loop antenna 13 is affected by the metal included in the rechargeable cell 2 under certain communication circumstances, the second loop antenna 14 is not susceptible to the rechargeable cell 2 and exhibits a high communication performance. The disposition of the second loop antenna 14 is not limited to the position between the rechargeable cell 2 and hinge 6 within the casing as long as the second loop antenna 14 is not susceptible to the rechargeable cell 2 within the casing.

Figure 10B:
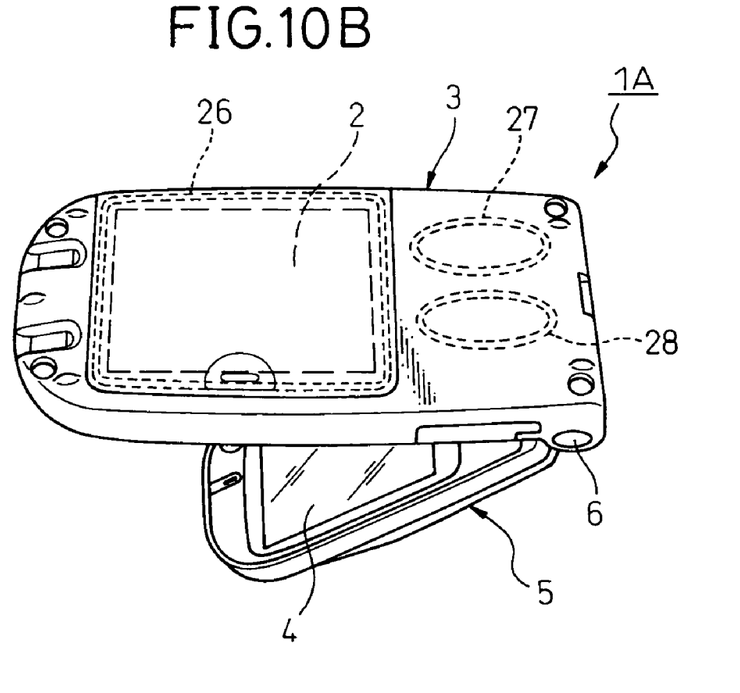
FIG. 10B shows the appearance of a portable cellular phone, that is electronic equipment, to show the second layout to be applied to the case where the main loop antenna and sub-loop antenna included in the present invention are incorporated in the portable cellular phone.

FIG. 10B shows a concrete example of the dispositions of the main loop antenna and sub-loop antennas, which are included in the third or fourth embodiment of the present invention, in a portable cellular phone 1A that is electronic equipment having a loop antenna. The dispositions of the main loop antenna and sub-loop antennas included in the third embodiment in the portable cellular phone 1A are identical to those of the main loop antenna and sub-loop antennas included in the fourth embodiment. Herein, a description will be made using the reference numerals employed in the third embodiment.

The configuration of the portable cellular phone 1A is identical to that shown in FIG. 10A. The portable cellular phone 1A includes a first casing 3 that accommodates a transmitter including a rechargeable cell 2 and a keyboard that is not shown, and a second casing 5 that accommodates a receiver including a display 4 and a camera. The first and second casings are joined by a hinge 6 and can be engaged with or disengaged from each other. A loop antenna to be connected to an IC chip is generally incorporated in the first housing 3. In this example, the first loop antenna 26 is disposed around the rechargeable cell 2, and the second and third loop antennas 27 and 28 are interposed between the rechargeable cell 2 and hinge 6 in the casing.

Consequently, the first loop antenna 26 may be affected by a metal included in the rechargeable cell 2. However, as the second and third loop antennas 27 and 28 are disposed away from the rechargeable cell 2, they are hardly affected by the metal included in the rechargeable cell 2. Consequently, even when the first loop antenna 27 is affected by the metal included in the rechargeable cell 2 under certain communication circumstances, the second and third loop antennas 27 and 28 are not susceptible to the rechargeable cell 2 and exhibit a satisfactory communication performance. The dispositions of the second and third loop antennas 27 and 28 are not limited to the positions between the rechargeable cell 2 and hinge 6 within the casing as long as the second and third loop antennas 2 and 28 are not susceptible to the rechargeable cell 2 within the casing. The second and third loop antennas 27 and 28 may not have the same size.

Although only some exemplary embodiments of this invention have been described in detail above, those skilled in the art will readily appreciate that may modifications are possible in the exemplary embodiments without materially departing from the novel teachings and advantages of this invention. Accordingly, all such modifications are intended to be included within the scope of this invention.

What is claimed is:

1. A loop antenna that is connected to an IC chip which has a CPU and a memory mounted thereon and which is incorporated in a casing, and that transmits or receives predetermined electromagnetic waves to or from a reader writer, comprising:
   a main loop antenna; and
   at least one sub-loop antenna disposed away from the main loop antenna,
   wherein said at least one sub-loop antenna is not arranged within the main loop antenna, the sub-loop antenna and the main loop antenna are connected in parallel with each other to the IC chip, and the loop antenna and sub-loop antenna include a resonant circuit realized by connecting a capacitor in parallel with part of the loop antenna.

2. The loop antenna according to claim 1, wherein a transmission/reception frequency at which the sub-loop antenna transmits or receives electromagnetic waves is different from a transmission/reception frequency at which the main loop antenna transmits or receives electromagnetic waves.

3. The loop antenna according to claim 1, wherein a transmission/reception frequency at which the sub-loop antenna transmits or receives electromagnetic waves is identical to a transmission/reception frequency at which the main loop antenna transmits or receives electromagnetic waves.

4. The loop antenna according to claim 2, wherein:
   the number of sub-loop antennas is two;
   the transmission/reception frequency of one sub-loop antenna is set to a frequency higher by a predetermined frequency than a transmission/reception frequency at which the reader writer transmits or receives electromagnetic waves; and
   the transmission/reception frequency of the other sub-loop antenna is set to a frequency lower by a predetermined frequency than the transmission/reception frequency of the reader writer.

5. The loop antenna according to claim 1, wherein the loop antenna is incorporated in an IC card.

6. The loop antenna according to claim 1, wherein the loop antenna is incorporated in a casing of electronic equipment.

7. The loop antenna according to claim 6, wherein the electronic equipment is a portable cellular phone.

8. The loop antenna according to claim 7, wherein the main loop antenna is disposed around a rechargeable cell included in the portable cellular phone, and each of the sub-loop antennas is located adjacent to the rechargeable cell within the casing so that each will not be superposed on the main loop antenna.

9. The loop antenna according to claim 1, wherein a transmission/reception frequency at which the sub-loop antenna transmits or receives electromagnetic waves is different from a transmission/reception frequency at which the main loop antenna transmits or receives electromagnetic waves.

10. The loop antenna according to claim 1, wherein a transmission/reception frequency at which the sub-loop antenna transmits or receives electromagnetic waves is identical to a transmission/reception frequency at which the main loop antenna transmits or receives electromagnetic waves.

11. Electronic equipment having a built-in antenna, wherein the antenna includes:
   a main loop antenna; and
   at least one sub-loop antenna disposed away from the main loop antenna,
   wherein said at least one sub-loop antenna is not arranged within the main loop antenna, the sub-loop antenna and the main loop antenna are connected in parallel with each other to the IC chip, and the loop antenna and the sub-loop antenna include a resonant circuit realized by connecting a capacitor in parallel with part of the loop antenna.

* * * * *